United States Patent
Guo et al.

(10) Patent No.: US 8,903,137 B1
(45) Date of Patent: Dec. 2, 2014

(54) SYSTEM AND METHOD FOR SUB-PIXEL ALIGNMENT OF DIGITAL GEOGRAPHIC IMAGERY

(71) Applicant: Google Inc., Mountain View, CA (US)

(72) Inventors: Hong Guo, Palo Alto, CA (US); Aaron David Yonas, Berkeley, CA (US); David Marwood, Mountain View, CA (US)

(73) Assignee: Google Inc., Mountain View, CA (US)

( * ) Notice: Subject to any disclaimer, the term of this patent is extended or adjusted under 35 U.S.C. 154(b) by 124 days.

(21) Appl. No.: 13/661,598

(22) Filed: Oct. 26, 2012

(51) Int. Cl.
*G06K 9/00* (2006.01)
*G06K 9/50* (2006.01)

(52) U.S. Cl.
USPC .......................................... 382/113; 382/201

(58) Field of Classification Search
CPC .............. G06K 9/4604; G06K 9/6202; G06K 9/00624; G06T 5/006; G06T 7/0042; G06T 7/0044; G06T 7/0046; G01B 11/005
USPC .................................................. 382/113, 201
See application file for complete search history.

(56) References Cited

U.S. PATENT DOCUMENTS

| | | | |
|---|---|---|---|
| 6,084,989 A * | 7/2000 | Eppler | 382/293 |
| 6,597,818 B2 | 7/2003 | Kumar et al. | |
| 6,628,845 B1 | 9/2003 | Stone et al. | |
| 7,254,249 B2 | 8/2007 | Rhoads et al. | |
| 8,121,433 B2 | 2/2012 | Leprince et al. | |
| 8,135,166 B2 | 3/2012 | Rhoads et al. | |
| 2010/0232728 A1 * | 9/2010 | Leprince et al. | 382/294 |

\* cited by examiner

*Primary Examiner* — Amir Alavi
*Assistant Examiner* — Kenny Cese
(74) *Attorney, Agent, or Firm* — Dority & Manning, P.A.

(57) ABSTRACT

Systems and methods for associating geographic coordinates with one or more points in a digital geographic image, such as a satellite image, aerial image, ground based image, street level image or other suitable geographic image are provided. More particularly, a digital geographic image can be analyzed to identify one or more features that may be suitable as measurement points for collecting measured ground truth data. The one or more features can be described as a mathematical model that defines image coordinates along the feature depicted in the digital geographic image with sub-pixel accuracy. Image coordinates can be assigned to the measurement points with sub-pixel accuracy using the mathematical model. Collected ground truth data can then be associated with the identified image coordinates to allow for the more precise association of geographic coordinate information to points in the digital geographic imagery.

14 Claims, 5 Drawing Sheets

SYSTEM AND METHOD FOR SUB-PIXEL ALIGNMENT OF DIGITAL GEOGRAPHIC IMAGERY

FIELD

The present disclosure relates generally to geo-referencing digital geographic images, and more particularly to associating geographic coordinate data with one or more points depicted in digital imagery with sub-pixel accuracy.

BACKGROUND

Digital images of geographic areas, such as satellite images, aerial images, images from the perspective of a ground level (e.g. street level images), and other images of a geographic area of interest, are often used as part of a geographic information system. Geo-referencing or alignment of the digital images with specific geographic coordinates can allow for the use of the digital images in surveying, mapping, and other applications. To improve the accuracy of the information associated with the digital images, it can be desirable to associate very accurate longitude, latitude, and/or altitude coordinates to one or more points depicted in the digital image.

Alignment of digital geographic images can include manually measuring ground truth data (e.g. manually measured latitude and longitude coordinates) at an easily visible point, such as a sidewalk corner, depicted in the digital geographic image. The measured ground truth data can then be associated with a specific pixel depicting the visible point in the digital geographic image. For instance, the pixel depicting the sidewalk corner can be identified and the measured ground truth data can be associated with the identified pixel. The association of measured ground truth data with a specific pixel depicted in the image provides an accuracy of at best about 0.5 pixels. For digital geographic imagery having a resolution of about 50 cm×50 cm pixels, this accuracy is at best about 25 cm of accuracy. Typical surveying techniques, however, can provide much higher accuracy, such as within about 2 cm to about 3 cm of accuracy.

SUMMARY

Aspects and advantages of the invention will be set forth in part in the following description, or may be obvious from the description, or may be learned through practice of the invention.

One exemplary aspect of the present disclosure is directed to a computer-implemented method of assigning geographic coordinate data to a point depicted in digital geographic imagery. The method includes accessing, at a computing device, a digital geographic image comprising a plurality of pixels. The method further includes detecting, with the computing device, a feature across a plurality of pixels in the digital geographic image and describing the feature as a mathematical model. The mathematical model defines images coordinates along the feature in the digital geographic imagery with sub-pixel accuracy. The method further includes identifying a measurement point located on the feature. Image coordinates associated with the measurement point can be identified with sub-pixel accuracy using the mathematical model. Geographic coordinate data, such as measured ground truth data, can then be associated with the identified image coordinates.

Other exemplary implementations of the present disclosure are directed to systems, apparatus, non-transitory computer-readable media, devices, and user interfaces for sub-pixel alignment of digital geographic imagery.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
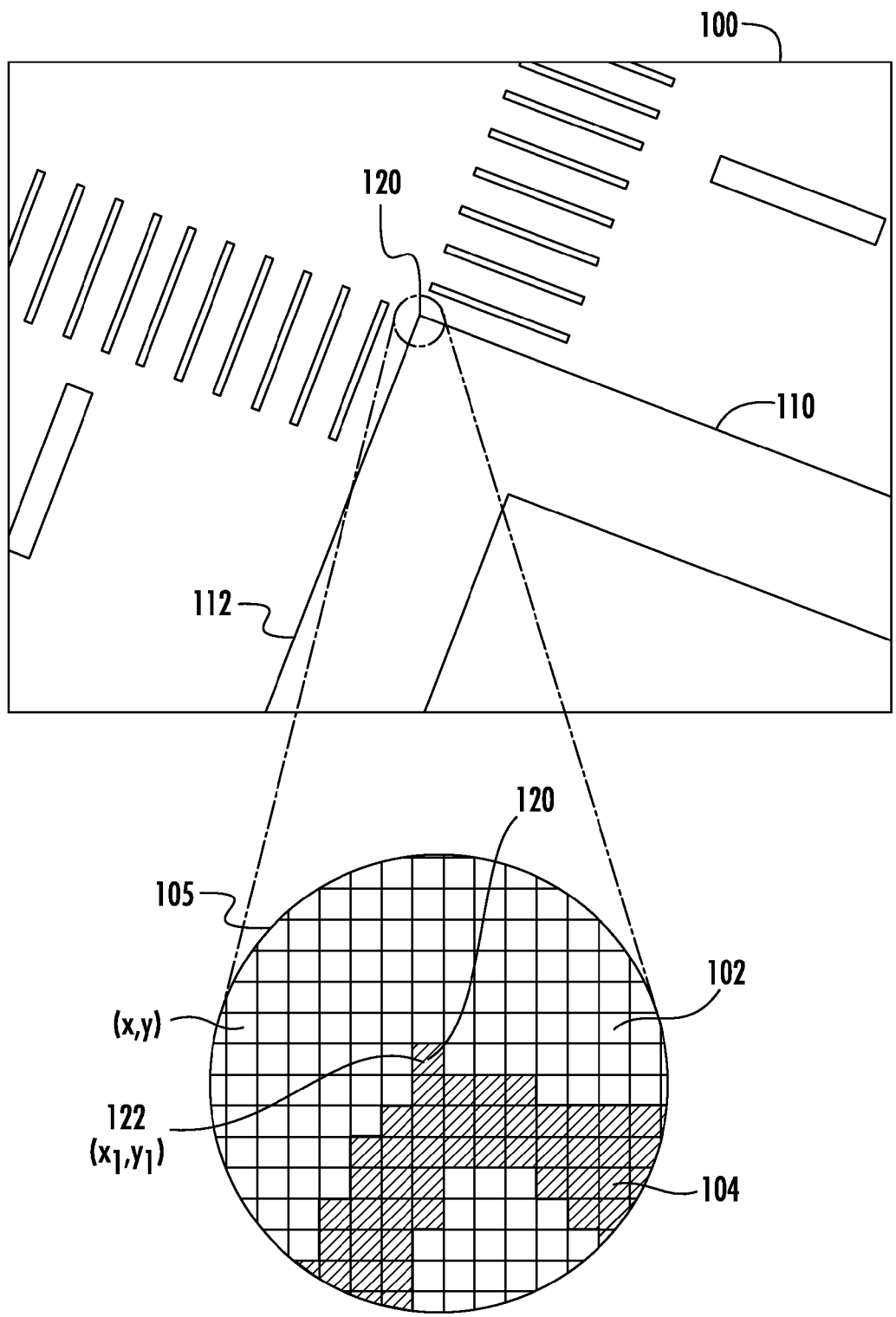
FIG. 1 depicts an exemplary digital image having a plurality of pixels and depicting a feature suitable for locating a measurement point according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to systems and methods for associating geographic coordinates with one or more points in a digital geographic image, such as a satellite image, aerial image, ground-based image, street level image, or other suitable geographic image. More particularly, a digital geographic image can be analyzed to identify one or more features that may be suitable as measurement points for collecting measured ground truth data (e.g. measured geographic coordinates obtained from a global positioning system (GPS) or other suitable positioning system). The one or more features can be described as a mathematical model that defines image coordinates along the feature depicted in the digital geographic image with sub-pixel accuracy. As used herein, sub-pixel accuracy refers to an accuracy that is higher than the pixel resolution of the digital geographic imagery. Image coordinates can be assigned to the measurement points with sub-pixel accuracy using the mathematical model. Collected ground truth data can then be associated with the identified image coordinates to allow for the more precise association of geographic coordinate information to points in the digital geographic imagery.

In one example, a plurality of straight edges, such as sidewalks, can be detected in the digital geographic image. Each of the plurality of straight edges can each be mathematically modeled as a line in the image coordinate space defined by the digital geographic image. A measurement point can be identified at the intersection of the mathematically defined lines. The intersection point can be described in image coordinates with sub-pixel accuracy based on the mathematical model describing the lines. Ground truth data can then be associated with this intersection point to accurately assign geographic coordinate information to the measurement point in the digital geographic image with sub-pixel accuracy.

An exemplary aspect of the present disclosure is directed to identifying suggested measurement points for measuring ground truth data. In particular, digital geographic imagery associated with a geographic area can be analyzed to detect one or more features and a mathematical model can be generated for the one or more detected features. Measurement points can be extracted from the mathematical model and suggested to a user, for instance, in a suitable user interface. The measurement points can be filtered based on a confidence that the measurement points can be associated with image coordinates with sub-pixel accuracy. The user can travel to the suggested measurement points to determine if the measurement points are suitable for obtaining ground truth data. If so, the user can obtain the ground truth data and provide the ground truth data for use in geo-referencing the digital geographic imagery with sub-pixel accuracy.

Sub-pixel alignment of digital geographic images according to aspects of the present disclosure can lead to increased accuracy in geolocation information provided as part of a geographic information system, such as a mapping application (e.g. the Google Maps™ mapping application) and/or a virtual globe application (e.g. the Google Earth™ virtual globe application). More particularly, digital geographic images, such as satellite images, aerial images, ground based images, street level images, and other images, provided as part of the geographic information system can provide higher precision geographic coordinate information for points depicted in the digital geographic images. The increased accuracy of the geolocation information provided in such geographic information systems can allow users to identify the precise geographic location of objects with increased reliability. In some cases, the geolocation information provided by the geographic information system can be useful for identifying latitude and longitude coordinates for a geographic area in surveying applications, replacing the need to re-acquire geographic coordinate information as part of surveying process.

FIG. 1 depicts an exemplary digital geographic image 100 of a geographic area. The digital geographic image 100 is a satellite image depicting a street intersection and a plurality of sidewalks. The digital geographic image 100 could similarly be an aerial image, ground-based image, street level image, or other suitable digital image of a geographic area. The digital geographic image 100 can be acquired using any suitable image capture device. As shown in the close up 105 of a portion of the geographic image 100, the digital geographic image 100 includes a plurality of pixels 102. Each of the plurality of pixels 102 has a pixel value that provides an average or integration of all the light in a geographic area. The size of the geographic area associated with each pixel 102 depends on the resolution of the geographic image 100. A high resolution geographic image will have pixels associated with a smaller geographic area than a low resolution geographic image. In one example, the pixels 102 of the digital geographic image 100 can be associated with a 50 cm×50 cm geographic area.

As further demonstrated in FIG. 1, each pixel can be associated with image coordinates (x, y) in an image coordinate system defined by the digital geographic image. The image coordinates of the pixel correspond to the address of the pixel relative to an origin in the image coordinate system. For instance, the image coordinates (x, y) can refer to the column and row number of the pixel relative to an origin. The origin can be defined at any location relative to the digital geographic image, such as the top left corner of the digital geographic image.

As discussed above, it can be desirable to associate specific geographic coordinate information to one or more points depicted in the digital geographic image 100. This can be accomplished by identifying a measurement point located on a readily identifiable feature depicted in the geographic image. Geographic coordinates for the measurement point (e.g. measured ground truth data) can be obtained and associated with image coordinates for the measurement point to georeference the digital geographic image 100.

For example, in FIG. 1, a measurement point 120 can be identified at the corner of substantially straight edges 110 and 112. Geographic coordinates can be obtained for the measurement point 120 by obtaining ground truth data at the measurement point 120 depicted in the digital geographic image 100. For instance, a surveyor or other individual can physically travel to the measurement point 120 in the real world and measure the geographic coordinates at the measurement point 120. The ground truth data for the measurement point can be obtained using any suitable positioning system, such as a GPS system or other suitable positioning system.

Once the ground truth data has been obtained, the measured ground truth data can be associated with image coordinates defined by the geographic image 100 by identifying the corresponding pixel 102 depicting the measurement point 120 in the geographic image 100. In the example of FIG. 1, the shaded pixels 104 are associated with the substantially straight edges 110 and 112 depicted in the geographic image. Pixel 122 depicts the measurement point 120 located at the corner of straight edges 110 and 112. Pixel 122 has image coordinates $(x_1, y_1)$. The measured ground truth data can be associated with image coordinates $(x_1, y_1)$ (e.g. stored as part of the pixel data associated with pixel 122) to georeference the digital geographic image 100 to specific geographic coordinates.

Figure 2:
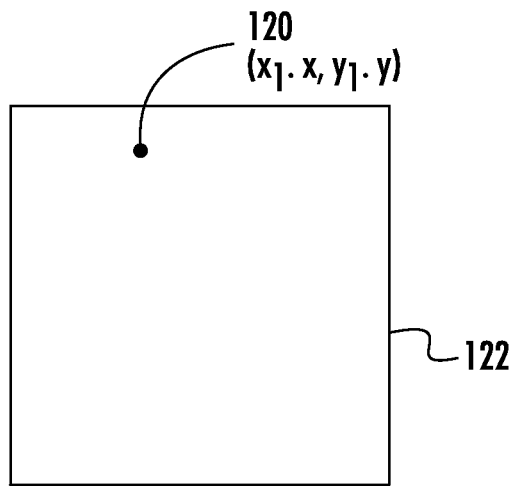
FIG. 2 depicts a representation of the sub-pixel location of a measurement point associated with the feature.

The above technique for associating geographic coordinate information with a measurement point depicted in geographic imagery does not align geographic coordinate information with the digital geographic image 100 with sub-pixel accuracy. FIG. 2 provides a close up of exemplary pixel 122 that depicts the measurement point 120 of FIG. 1. As illustrated, the measurement point 120 is located at a discrete location within the pixel 122. Associating measured ground truth data with image coordinates $(x_1, y_1)$ for the entire pixel 122 does not identify the precise location of the measurement point within the pixel 122. At best, measured ground truth data is associated with the geographic image at an accuracy of at best about 0.5 pixels. For digital geographic imagery having a resolution of about 50 cm×50 cm pixels, this accuracy is at best about 25 cm of accuracy.

According to aspects of the present disclosure, more precise image coordinates $(x_1.x, y_1.y)$ for the measurement point 120 can be identified with sub-pixel accuracy within the pixel 122. The image coordinates ($x_1.x, y_1.y$) can identify the location of the measurement point 120 within the pixel 122. For instance, "$x_1$" and "$y_1$" portion of the image coordinates can be the address of the particular pixel 122. The ".x" and ".y" portion of the image coordinates can refer to the specific location within the pixel 122. Any suitable technique for representing image coordinates with sub-pixel accuracy can be used without deviating from the scope of the present disclosure. Associating measured ground truth data with the more precise image coordinates ($x_1.x, y_1.y$) can lead to increased accuracy of geographic coordinate data assigned to the measurement point 120.

Figure 3:
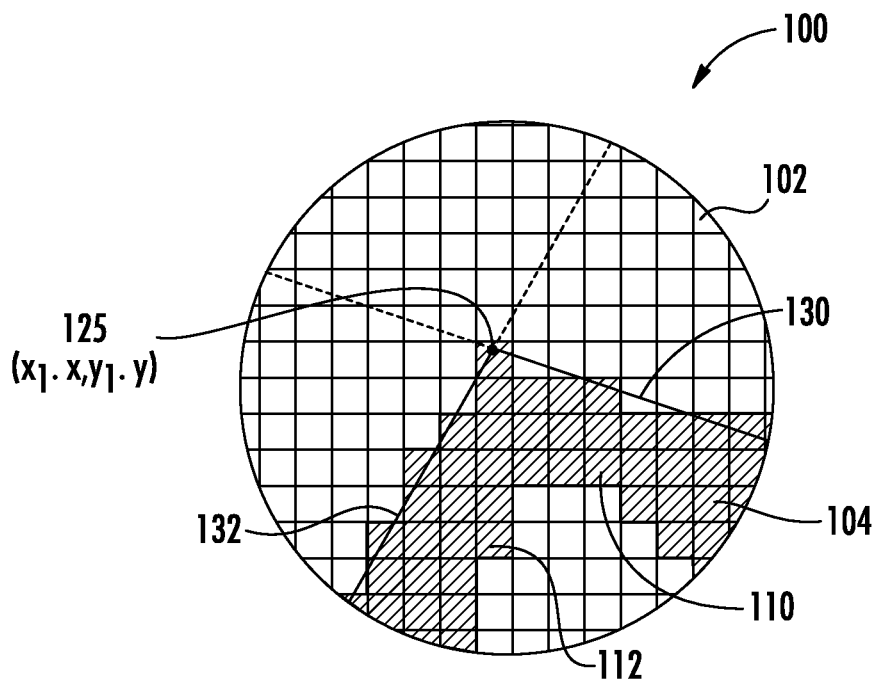
FIG. 3 depicts describing the feature as a mathematical model to identify image coordinates associated with the measurement point with sub-pixel accuracy according to an exemplary embodiment of the present disclosure

FIG. 3 graphically depicts an exemplary technique for identifying image coordinates associated with the location of measurement point 120 with sub-pixel accuracy according to an exemplary embodiment of the present disclosure. First, the location of a feature, such as straight edges 110 and 112, is detected in the geographic image 100. The feature can be detected using any suitable feature detection technique, such as edge and/or line feature detection, corner feature detection, point-based feature detection, or other suitable detection technique.

FIG. 3 depicts the detection of straight edges in the digital geographic imagery for purposes for purposes of illustration and discussion. Those of ordinary skill in the art, using the disclosures provided herein, should understand that aspects of the present disclosure can be directed to the detection of any feature that can be mathematically modeled with sub-pixel accuracy without deviating from the scope of the present disclosure. For instance, the feature can be a circular feature, a rectangular feature, elliptical feature, or any other suitable feature capable of being mathematically modeled with sub-pixel accuracy.

The location of the edges 110 and 112 depicted in the geographic image 100 can be detected using a suitable edge detection operator, such as a Sobel, Canny, or Laplacian edge detection operator, to identify pixels where color/grayscale values are not continuous. In a particular implementation, the digital geographic image 100 can be orthorectified prior to detecting the edges to ensure that edges in the real world appear as straight edges in the digital geographic image 100. Preferably, the edges are detected across a plurality of pixels, such as across the plurality of shaded pixels 104 depicted in FIG. 3, to improve the accuracy of sub-pixel identification.

Once the edges are detected, the edges can be analyzed to determine whether the edges are straight edges that can be described as a mathematical model that defines image coordinates along the feature with sub-pixel accuracy. If the edges are straight edges, the edges can be described as mathematical lines describing the straight edges. For instance, the detected straight edge 110 can be described as a line 130. The line 130 can be described by $y=A_1x+B_1$ where (x, y) define image coordinates along the line 130 with sub-pixel accuracy. The coefficients $A_1$ and $B_1$ can be estimated to best fit the line 130 with the location of the detected straight edge 110. Similarly, the detected straight edge 112 can be described as a line 132. The line 132 can be described by $y=A_2x+B_2$ where (x, y) define image coordinates along the line 132 with sub-pixel accuracy. The coefficients $A_2$ and $B_2$ can be estimated to best fit the line 130 with the location of the detected straight edge 110. Preferably, multiple pixels associated with straight edges 110 and 112 are used to determine the lines 130 and 132 to improve the accuracy of the model. The more pixels used to model the feature, the greater the accuracy of the model in identifying the location of the measurement point with sub-pixel accuracy. As will be discussed in detail below, a linear Hough transform can be used to identify edges as straight edges and to describe the edges as a mathematical line.

Once the feature has been modeled, image coordinates associated with the measurement point 120 can be identified with sub-pixel accuracy from the mathematical model. For instance, image coordinates associated with the measurement point 120 can be identified by determining an intersection 125 of the lines 130 and 132 describing the straight edges 110 and 112 in the geographic image 100. In one aspect, the image coordinates associated with the intersection 125 can be identified by solving for image coordinates common to both the line 130 describing straight edge 110 and the line 132 describing straight edge 112. Because the lines 130 and 132 describe image coordinates with sub-pixel accuracy, the identified image coordinates ($x_1.x, y_1.y$) associated with the intersection 125 will also be identified with sub-pixel accuracy.

Geographic coordinate data, such as measured ground truth data, can then be associated with the identified image coordinates to geo-reference the digital geographic image 100 with increased accuracy. More particularly, because image coordinates ($x_1.x, y_1.y$) with sub-pixel accuracy are known for the measurement point 120, geographic coordinate data can be more precisely associated with the measurement point 120 at the identified image coordinates.

Figure 4:
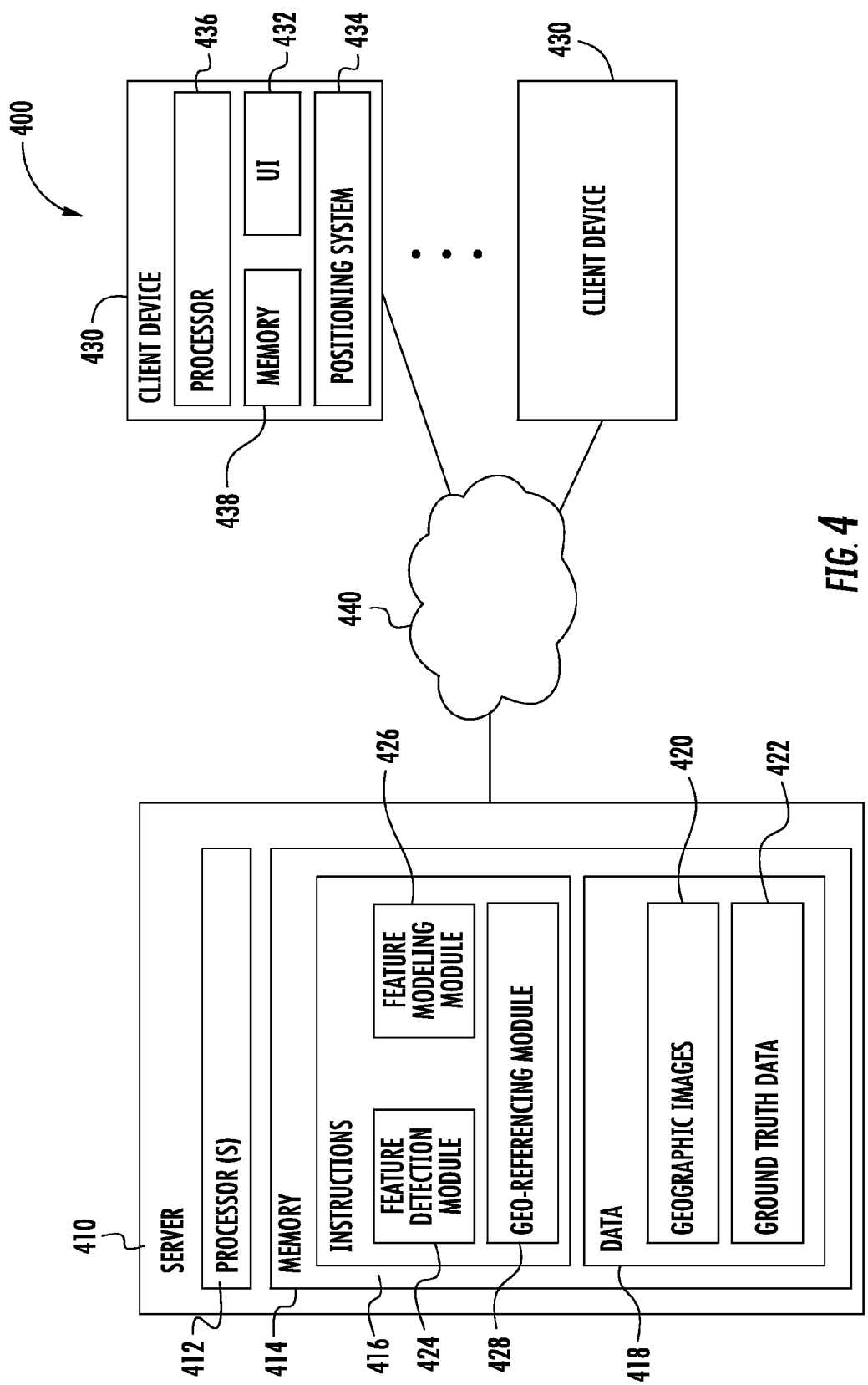
FIG. 4 depicts an exemplary system according to an exemplary embodiment of the present disclosure.

FIG. 4 depicts an exemplary computing system 400 for associating geographic coordinates with one or more points in a digital geographic image according to an exemplary embodiment of the present disclosure. The system 400 provides for the geo-referencing of digital geographic images, such as satellite images, aerial images, ground based images, street level images, and other suitable images with sub-pixel accuracy. In addition, the system 400 can identify suggested measurement points for obtaining measured ground truth data to be used in geo-referencing digital geographic images and provide the suggested measurement points to users via a suitable user interface.

The system 400 can include a client-server architecture where a server 410 communicates with one or more clients 430 over a network 440. Although two clients are illustrated in FIG. 4, any number of clients 430 can be connected to the server 410 over the network 440. In addition, although system 400 is illustrated as a client-server arrangement, one of ordinary skill in the art, using the disclosures provided herein, will recognize that the inherent flexibility of computer-based systems allows for a great variety of possible configurations, combinations, and divisions of tasks and functionality between and among components. For instance, the processes and methods discussed herein for geo-referencing digital geographic imagery can be implemented on a single computing device or across multiple computing devices.

The server 410 can host a geo-referencing application that provides for the association of geographic coordinates with one or more points depicted in a digital geographic image. The server 410 can be configured to receive requests for data, such as suggest measurement points, and respond to those requests via the network 440. For instance, the server 410 can encode data in one or more data files and provide the data files to a client 430 over the network 440.

On the client-side, each client 430 can present a user interface 432 that allows a user to interact with the server 410. For instance, the user interface 432 can present a plurality of suggested measurement points identified by the server 410 to the user. A user can obtain measured ground truth data, for instance, using a positioning system 434 associated with the client 430, at one or more of the suggested measurement points and transmit the measured ground truth data to the server 410. The data can be encoded in one or more data files and provided to the server 410 over the network 440. The server 410 can store the measured ground truth data in memory for use in georeferencing digital geographic images.

The server 410 can be any computing device and can include one or more processor(s) 412 and a memory 414. The processor(s) 412 can be any suitable processing device such as microprocessor. The memory 414 can include any suitable computer-readable medium or media, including, but not limited to, RAM, ROM, hard drives, flash drives, or other memory devices. The memory 114 can store data 418 used in the system 400. For instance, memory 114 can include or be coupled to a digital geographic image database 420 and a measured ground truth database 422. The server 410 can communicate with other databases as needed. The databases can be connected to the server 410 by a high bandwidth LAN or WAN, or could also be connected to server 410 through network 440. The databases, including digital geographic image database 420 and measured ground truth database 422 can be split up so that they are located in multiple locales.

The digital geographic image database 420 can store digital geographic images, such as satellite images, aerial images, ground based images, street level images, or other suitable digital geographic images. The digital geographic images can be captured by any suitable image capture device. The digital geographic images can be used as part of a geographic information system. According to aspects of the present disclosure, geographic coordinates can be associated with the digital geographic images with sub-pixel accuracy to provide more accurate geo-referencing of the geographic images.

The measured ground truth database 422 stores measured geographic coordinates, such as latitude and longitude coordinates, for points depicted in the digital geographic images. The measured ground truth database 422 can receive ground truth measurements from any suitable source. For instance, the measured ground truth data can be collected by a positioning system (e.g. a GPS positioning system) in communication with or coupled to the server 410. As another example, the measured ground truth data can be provided by a surveying service that provides ground truth data for various geographic areas. As yet another example, the measured ground truth data can be received from clients 430 over the network 440. For instance, surveyors or other users can acquire ground truth data for suggested measurement points identified by server 410 and provide the ground truth data to the server 410 over the network 440.

The memory 414 can also store instructions 116 which cause the processor(s) 412 to perform operations. For instance, the memory 414 can store instructions to implement one or more modules, such as a feature detection module 424, a feature modeling module 426, and a geo-referencing module 428. It will be appreciated that the term "module" refers to computer logic utilized to provide desired functionality. Thus, a module can be implemented in hardware, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM hard disk or optical or magnetic media.

The feature detection module 424 can be configured to analyze digital geographic images to identify one or more features that include suitable measurement points for geo-referencing the digital geographic images. The feature detection module 424 can implement any suitable feature detection technique, such as edge feature detection, corner feature detection, point-based feature detection, or other suitable feature detection technique. For instance, the feature detection module 424 can implement one or more edge detection operators to identify a plurality of intersecting straight edges in a digital geographic image. The edge detection operator can analyze the digital geographic image to identify pixels where color/grayscale values are not continuous. Exemplary edge detection operators include Sobel, Canny, and Laplacian edge detection operators. In a particular implementation, the feature detection module 424 can be configured to orthorectify the digital geographic images prior to detecting the plurality of straight edges to ensure that straight edges in the real world appear as straight edges in the digital geographic images.

The feature modeling module 426 can be configured to determine whether the detected feature can be modeled with sub-pixel accuracy and can be configured to describe any detected features as a mathematical model. In one example, the feature modeling module 426 can be configured to identify a detected edge as a straight edge and to model the detected straight edge as a line $y=Ax+B$ where x and y are image coordinates defined with sub-pixel accuracy along the edge and A and B are coefficients that can be estimated to best fit the line to the detected feature. In one implementation, the feature modeling module 426 can implement a linear Hough transform to model the straight edge as a mathematical line.

The geo-referencing module 428 can be configured to identify image coordinates associated with measurement points from the mathematical model and to associated measured ground truth data with the identified measurement points to geo-reference the digital geographic images. For instance, the geo-referencing module 428 can identify the intersection of two or more straight edges described as mathematical lines and identify the image coordinates associated with the intersection. Measured ground truth data (e.g. data stored in measured ground truth database 422) for a measurement point located at the intersection can be associated with the identified image coordinates to align a digital geographic image with sub-pixel accuracy.

Other modules can be implemented by the server 410. Any number of modules can be programmed or otherwise configured to carry out the functionality described herein. In addition, the various components on the server 410 can be rearranged. Other configurations will be apparent in light of this disclosure and the present disclosure is not intended to be limited to any particular configuration.

A client 430 can be any computing device that can be used by a user to interact with the system 400. For instance, a client can be a personal computer, smartphone, mobile device, desktop, laptop, PDA, tablet, or other computing device. In short, a client 430 can be any computer device or system that can execute instructions to allow a user to interact with the system 400.

The client 430 can include a processor 436 and a memory 438. The processor 436 can be any suitable processing device. The memory 438 can store computer-readable instructions that when executed by the processor 436 cause the processor 436 to perform operations. The client 430 can include various input/output devices for providing and receiving information from a player, such as a touch screen, touch pad, data entry keys, speakers, and/or a microphone suitable for voice recognition. The client 430 can include a display for presenting information to the user. The client 430 can further include a network interface 438 for providing communications over the network 440. The network interface can be any device/medium that allows the client to interface with the network 440.

According to certain exemplary aspects of the present disclosure, the client 430 can be configured to present a user interface 432, for instance on a display device, that presents suggested measurement points to a user. The client 430 can obtain measured ground truth data for one or more of the suggested measurement points using the positioning system 434. The positioning system 434 can be any suitable positioning system configured to obtain latitude and longitude at a geographic location, such as GPS positioning system. The client 430 can send measured ground truth data to the server 410 over network 440 for use in geo-referencing digital geographic images.

The network 440 can be any type of communications network, such as a local area network (e.g. intranet), wide area network (e.g. Internet), or some combination thereof. The network can also include a direct connection between a client 430 and the server 410. In general, communication between the server 410 and a client 430 can be carried via a network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

Figure 5:
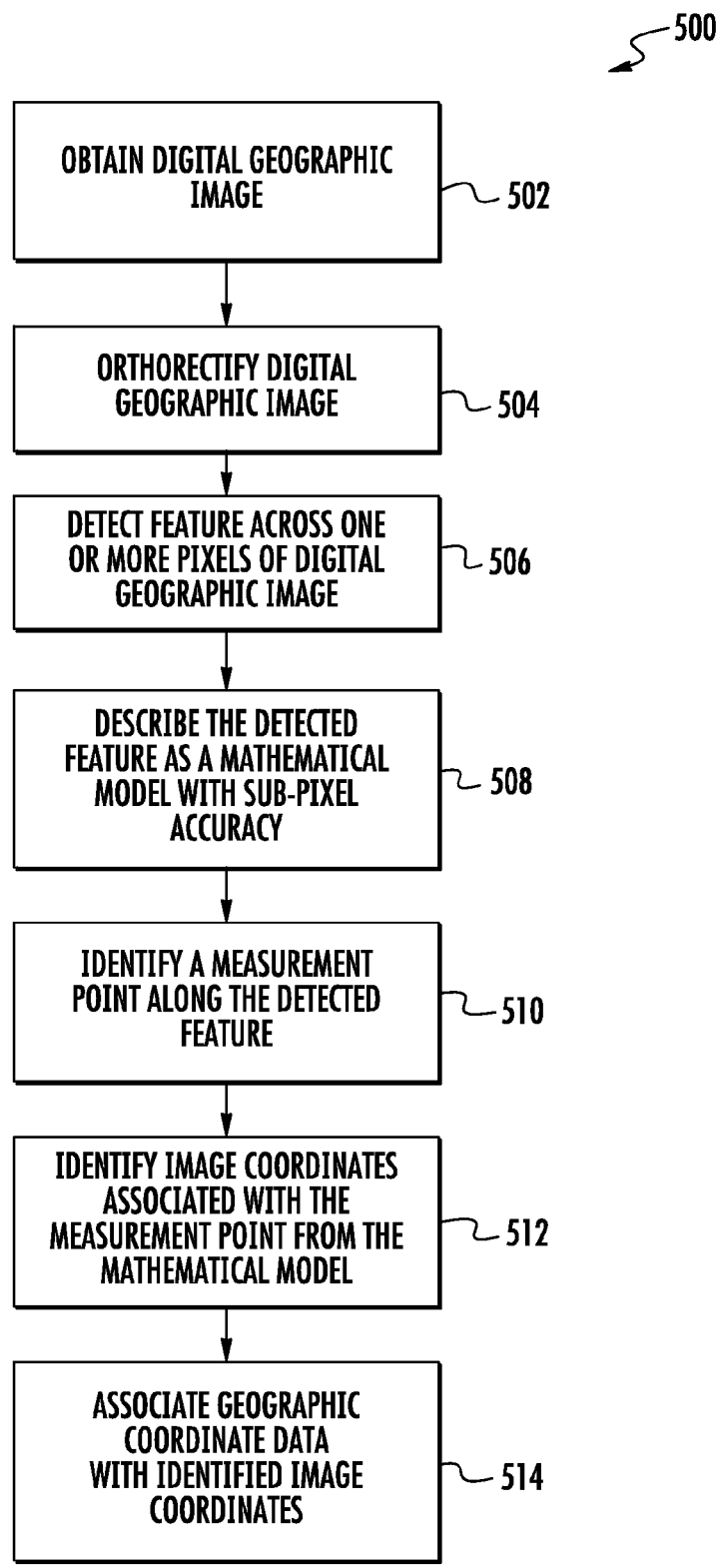
FIG. 5 depicts a flow diagram of an exemplary method according to an exemplary embodiment of the present disclosure.

FIG. 5 depicts a flow diagram of an exemplary method 500 for associating geographic coordinates with one or more points in a digital geographic image according to an exemplary embodiment of the present disclosure. The method 500 can be implemented using one or more computing devices, such as one or more of the computing devices depicted in FIG. 4. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined and/or adapted in various ways.

At (502), the method includes obtaining a digital geographic image. For instance, the server 410 can access one or more digital geographic images stored in the digital geographic image database 420. The digital geographic image can be a satellite image, an aerial image, a ground-based image, a street level image, or other suitable image of a geographic area. The digital geographic image 420 includes a plurality of pixels. Each of the pixels has a pixel value (e.g. color or grayscale value) value that provides an average or integration of all the light in a geographic area. Each of the plurality of pixels defines a plurality of image coordinates in an image coordinate system associated with the digital geographic image. Image coordinates having sub-pixel accuracy (an accuracy higher than the pixel resolution of the image) can be defined across the plurality of pixels.

At (504), the digital image can be orthorectified. For instance, the server 410 can implement a feature detection module 424 that is configured to orthorectify the digital geographic image. Orthorectifying a digital geographic image can include geometrically correcting the image, such as an aerial image, such that the scale of the image is uniform. Orthorectifying the image can increase the ability to detect certain features in the digital geographic image. For instance, orthorectifying the image can ensure that straight edges in the real world appear as straight edges in the digital geographic image.

At (506), the method includes detecting a feature across one or more pixels of the digital geographic image. For instance, the feature detection module 424 can analyze the digital geographic image to identify one or more features that are suitable for identifying measurement points according to exemplary aspects of the present disclosure. Preferably, the detected feature is capable of being described as a mathematical model that identifies image coordinates along the feature with sub-pixel accuracy. The feature can be a circle, ellipse, square, one or more straight edges, or other suitable feature.

In one implementation, the detected feature can be a plurality of straight edges in the digital geographic image. For instance, the feature detection module 424 can implement a suitable edge detection operator to identify a plurality of edges in the digital geographic image. The edge detection operator can analyze the pixels to identify pixels with non-continuous color/grayscale values. The edges can then be further analyzed to determine whether the edges are straight edges.

One suitable edge detection operator is a Sobel edge detection operator. The Sobel edge detection operator can calculate a gradient of image intensity at one or more points in the image. The gradient of image intensity identifies how much an image changes at a point and can be used to identify edges in the digital geographic image. Another suitable edge detection operator is the Canny edge detection operator. The Canny edge detection operator is a multistage edge detection operator that can involve filtering (e.g. applying a Gaussian filter) the digital geographic image and identifying intensity gradients in the image. The intensity gradients can be used to identify edges in the image, which can be traced to identify edge pixels and non-edge pixels in the image. Yet another suitable edge detection operator is the Laplacian edge detection operator. The Laplacian edge detection operator is a zero-crossing based method that searches for zero crossings in a second-order derivative expression computed from the image to detect edges in the image. The Sobel, Canny, and Laplacian operators are exemplary edge detection operators that are provided for purposes of illustration and discussion. Those of ordinary skill in the art, using the disclosures provided herein, will understand that any suitable edge detection operator can be used, without deviating from the scope of the present disclosure.

At (508), the method includes describing the detected feature as a mathematical model that defines image coordinates along the feature in the digital geographic imagery with sub-pixel accuracy. For instance, the feature modeling module 426 can describe the detected feature as a mathematical model that defines image coordinates along the feature with sub-pixel accuracy. If the detected feature is a plurality of straight edges, each of the straight edges can be modeled as a line $y=Ax+B$ where x and y are image coordinates along the line. The coefficients A and B can be estimated for each line to complete the mathematical model.

In one implementation, edges are identified as straight edges using a linear Hough transform. The linear Hough transform also identifies the coefficients A and B for modeling the straight edge as a mathematical line $y=Ax+B$. More particularly, the line $y=Ax+B$ can be rewritten in polar coordinates as $r=x\cos(t)+y\sin(t)$ where t is the angle of the vector from the origin to the closest point on the line and r is the distance from the origin to the line. The plane (r, t) can be referred to as the linear Hough space. The linear Hough transform is a two-dimensional accumulator in the linear Hough space where r and t are quantized. For each edge pixel $(x_i, y_i)$ detected by the edge detection operator, a given r value is used to compute a correspond t and accumulate the corresponding bin in the (r, t) space. If a group of edge pixels lie on a line, there will be a local maxima in (r, t) space (e.g. the bin count is larger than its neighbors). The corresponding (A, B) value can be obtained using the (r, t) value of the maxima. The algorithm is very robust and works even when the line is broken.

Once the feature has been detected and described as a mathematical model, the method can include identifying a measurement point located on the detected feature (510). The measurement point should be identified at a location that is readily identifiable from the mathematical model describing the detected feature. In one example, the measurement point is identified at the location of the intersection of the detected straight edges in the digital geographic image.

At (512), the method includes identifying image coordinates associated with the measurement point with sub-pixel accuracy from the mathematical model. In the example where the measurement point is located at the intersection of the detected straight edges, the image coordinates associated with the measurement point can be identified with sub-pixel accuracy from the mathematical model by determining the intersection of the lines used to mathematically model the straight edges. For example, image coordinates common to all lines used to model the straight edges can be identified to determine the image coordinates at the intersection of the lines used to mathematical model the straight edges.

Once the image coordinates associated with the measurement point are identified with sub-pixel accuracy, geographic coordinate data can be associated with the identified image coordinates (514). As a result, measured ground truth data can be associated with a point in the digital geographic image with sub-pixel accuracy, resulting in more accurate geo-referencing of the digital geographic image.

One exemplary aspect of the present disclosure is directed to a method of identifying measurement points, in advance of obtaining measured ground truth data, that are suitable for geo-referencing digital geographic images with sub-pixel accuracy. In particular, a computing device can analyze digital geographic imagery depicting a geographic area using the analysis techniques discussed herein to identify suitable measurement points that can be associated with image coordinates with sub-pixel accuracy. Once these measurement points have been identified, the measurement points can be presented to a user or a plurality of users in a suitable user interface. The user can travel to the suggested measurement points to determine if the measurement point is suitable for obtaining measured ground truth data. If so, the user can perform a ground truth measurement and send the ground truth data to the computing device for geo-referencing the geographic image.

Figure 6:
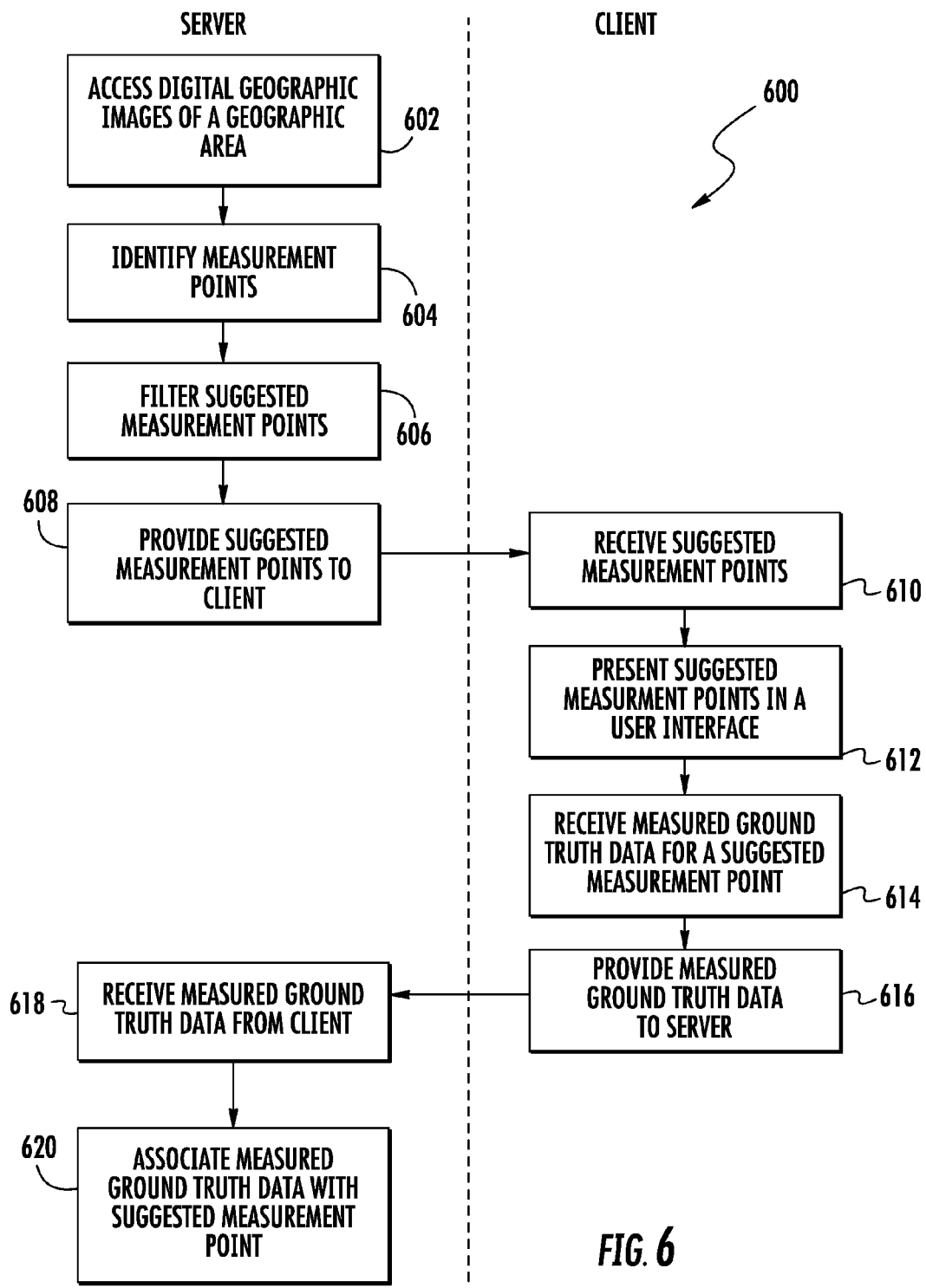
FIG. 6 depicts a server-client flow diagram according to an exemplary embodiment of the present disclosure.

FIG. 6 depicts a sever-client flow diagram of an exemplary method according to this exemplary aspect of the present disclosure. The method 600 will be discussed with reference to a computing system having a server-client architecture, such as the computing system 400 depicted in FIG. 4. However, the method 600 can be implemented using any suitable computing system. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined and/or adapted in various ways.

At (602), the server accesses digital geographic images of a geographic area. For instance, the server 410 can access one or more digital geographic images of a geographic area stored in the geographic image database 420. At (604), the server can identify a plurality of measurement points in the digital geographic images. More particularly, the server can perform image analysis techniques on the one or more digital geographic images to identify points depicted in the digital geographic images that can be identified with sub-pixel accuracy.

For instance, the digital geographic images can be analyzed to identify a plurality of straight edges. A measurement point can be identified at the plurality of straight edges. The plurality of straight edges can be described using a mathematical model identifying image coordinates along the straight edges with sub-pixel accuracy. In particular, each straight edge can be described by a mathematical line. Image coordinates associated with the measurement point can be identified from the mathematical model. For instance, image coordinates associated with the measurement point can be identified by determining the intersection of the mathematical lines uses to model the plurality of straight edges.

Once a plurality of measurement points have been identified from the digital geographic imagery, the server can filtered to identify a plurality of suggested measurement points (606). In one embodiment, the plurality of measurement points are filtered based on a confidence that the measurement point can be associated with image coordinates with sub-pixel accuracy. For example, a confidence value for each measurement point identified from the plurality of digital geographic images can be determined. The confidence value can be based on the likelihood that image coordinates associated with the measurement point can be identified with sub-pixel accuracy. Measurement points located on features that can be described accurately with sub-pixel accuracy (e.g. measurement points located at the intersection of two or more straight edges), can be assigned relatively high confidence values. Measurement points located on features that cannot be described very accurately with sub-pixel accuracy (e.g. measurement points located on irregular features) can be assigned relatively low confidence values. The server can filter the measurement points based on the confidence values to identify a plurality of suggested measurement points that have relatively high confidence values to a user.

At (608), the server can provide the suggested measurement points to one or more client devices. A client device receives the suggested measurement points at (610) and presents the suggested measurement points in a suitable user interface (612). The user interface can provide any representation of the suggested measurement points. For instance, the suggested measurement points can be provided in list form. Alternatively, the suggested measurement points can be identified on a map of a geographic area displayed to the user. In areas that a rich with measurement points, the user interface could display the nearest measurement point or snap a cursor or other gesture-based selection input to the nearest suggested measurement point.

A user of the client device can travel to the suggested measurement point to determine if the suggested measurement point is suitable for performing a ground truth measurement for use in geo-referencing digital geographic images. Certain locations, such as sidewalk corners, are suitable for ground truth measurements. Other locations, such as painted road lines, power lines, building corners, etc. may be unsuitable for ground truth measurements. If the suggested measurement point is not suitable for a ground truth measurement, the client can receive user input indicating that the suggested measurement point is not suitable for obtaining ground truth data. The client can then provide data to the server indicating that the suggested measurement point is not suitable for obtaining ground truth data. The suggested measurement point can then be removed from a list of a plurality of suggested measurement points maintained by the server.

If the suggested measurement point is suitable for a ground truth measurement, the client device can receive measured ground truth data for a suggested measurement point (614). For instance, measured latitude and longitude coordinates for the measurement point can be received at the client device. The measured ground truth data can be obtained from any source, such as a source external to the client device. In one embodiment, the client device itself can perform the ground truth measurement. For instance, a user can carry a client device, such as a smartphone or other mobile device, to the location of the suggested measurement point. The user can then provide an input requesting to record a ground truth measurement with the client device at the measurement point. In response to this input, a positioning system, such as a GPS, associated with the client device can record the location of the client device at the measurement point. The measure ground truth data can then be provided to the server (616).

In situations in which the client device collects position data, such as measured ground truth data, the user of the client device may be provided with an opportunity to control whether the client device collects such position data. In addition, the data may be treated in one or more ways before it is stored or used so that personally identifiable information is removed. The user may have control over how the information, such as measured ground truth data, is collected and used by the server.

The server receives the measured ground truth data from the client at (618) and associates the measured ground truth data with the suggested measurement point at (620). For instance, the server can access previously identified image coordinates associated with the suggested measurement point and associated the measured ground truth data with the image coordinates. As the server receives additional ground truth measurements from one or more client devices, the server can associate these additional ground truth measurements with identified measurement points. In this way, digital geographic imagery associated with a geographic can be geo-referenced with sub-pixel accuracy in a more efficient manner.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer assisted method of assigning geographic coordinate data to a point depicted in digital geographic imagery, comprising:
   accessing, by one or more computing devices, a digital geographic image comprising a plurality of pixels;
   detecting, by one or more computing devices, a feature across a plurality of pixels in the digital geographic image, wherein the feature comprises a straight edge;
   generating, by the one or more computing devices, a mathematical model based at least in part on the feature, the mathematical model defining image coordinates along the feature in the digital geographic imagery with sub-pixel accuracy;
   identifying, by the one or more computing devices, a measurement point located on the feature;
   identifying, by the one or more computing devices, image coordinates associated with the measurement point with sub-pixel accuracy from the mathematical model; and
   associating, by the one or more computing devices, geographic coordinate data with the identified image coordinates
   wherein generating, by the one or more computing devices, a mathematical model comprises:
   defining, by the one or more computing devices, the straight edge as a mathematically defined line having a slope coefficient and an intercept coefficient in the image coordinate system; and
   estimating, by the one or more computing devices, one or more of the slope coefficient and the intercept coefficient of the mathematically defined line.

2. The computer assisted method of claim 1, wherein prior to detecting, by the one or more computing devices, a feature across a plurality of pixels in the digital geographic image, the method comprises orthorectifying, by the one or more computing devices, the digital geographic image.

3. The computer assisted method of claim 1, wherein the straight edge is detected using an edge detection operator.

4. The computer assisted method of claim 3, wherein the edge detection operator comprises one or more of a Sobel, Canny, or Laplacian edge detection operator.

5. The computer assisted method of claim 1, wherein generating, by the one or more computing devices, a mathematical model comprises:
   defining, by the one or more computing devices, the straight edge as a line y=Ax+B, where x and y are image coordinates along the line; and
   estimating, by the one or more computing devices, coefficients A and B for the line.

6. The computer assisted method of claim 1, wherein estimating, by the one or more computing devices, one or more of the slope coefficient and the intercept coefficient is performed using a linear Hough transform.

7. The computer assisted method of claim 5, wherein identifying, by the one or more computing devices, a measurement point located on the feature comprises identifying, by the one or more computing devices, a point at an intersection of a plurality of straight edges depicted in the digital geographic image.

8. The computer assisted method of claim 7, wherein identifying, by the one or more computing devices, image coordinates associated with the measurement point with sub-pixel accuracy from the mathematical model comprises:
   determining, by the one or more computing devices, an intersection of mathematically defined lines describing each of the plurality of straight edges; and
   identifying, by the one or more computing devices, the image coordinates at the intersection of the lines.

9. The computer assisted method of claim 1, wherein the digital geographic image is a satellite image, an aerial image, a ground based image, or a street level image.

10. The computer assisted method of claim 1, wherein the method comprises:
    providing, via a network interface, the identified measurement point to one or more remote computing devices; and
    receiving, by the one or more computing devices, measured geographic coordinate data associated with the identified measurement point from the one or more remote computing devices.

11. The computer assisted method of claim 1, wherein the method comprises
    detecting, by the one or more computing devices, a plurality of features in one or more digital geographic images;
    identifying, by the one or more computing devices, a plurality of measurement points, each of the plurality of measurement points located on one of the plurality of features;
    filtering, by the one or more computing devices, the plurality of measurement points to identify a set of suggested measurement points, the plurality of measurement points being filtered based on a confidence that each measurement point can be associated with image coordinates with sub-pixel accuracy; and providing for display, by the one or more computing devices, the set of suggested measurement points in a user interface presented on a display device.

12. A computing device comprising one or more processors and at least one memory, the at least one memory storing non-transitory computer-readable instructions for execution by the one or more processors to cause the one or more processors to perform a set of operations, the operations comprising:

obtaining a digital geographic image comprising a plurality of pixels;

detecting a plurality of straight edges in the digital geographic image, each of the plurality of straight edges extending across a plurality of pixels in the digital geographic image;

defining each of the plurality of straight edges as a line used to mathematically model the straight edge, the line defining image coordinates along the straight edge in the digital geographic imagery with sub-pixel accuracy;

identifying a measurement point located at an intersection of the plurality of straight edges;

identifying image coordinates associated with the measurement point with sub-pixel accuracy by determining the image coordinates of an intersection of the lines used to mathematically model the plurality of straight edges; and associating geographic coordinate data with the identified image coordinates;

wherein the operation of defining each of the plurality of straight edges as a line used to mathematically model the straight edge comprises the operations of;

defining each of the plurality of straight edges as a line $y=Ax+B$, where x and y are image coordinates along the line; and estimating A and B for each of the lines.

13. The computing device of claim 12, wherein the operation of detecting a plurality of straight edges in the digital geographic imagery is performed using one or more of a Sobel, Canny, or Laplacian edge detection operator.

14. The computing device of claim 12, wherein the operation of estimating coefficients A and B for each of the lines is performed using a linear Hough transform.

* * * * *